United States Patent

Lengsfeld

[11] Patent Number: 5,975,746
[45] Date of Patent: Nov. 2, 1999

[54] PROCESS FOR MONITORING BAR CUTOFF ON AUTOMATIC BAR LATHES

[75] Inventor: Dieter Lengsfeld, Wedemark, Germany

[73] Assignee: Dr. Johannes Heidenhain GmbH, Traunreut, Germany

[21] Appl. No.: 08/615,225

[22] PCT Filed: Sep. 13, 1994

[86] PCT No.: PCT/EP94/03054

§ 371 Date: Mar. 14, 1996

§ 102(e) Date: Mar. 14, 1996

[87] PCT Pub. No.: WO95/08141

PCT Pub. Date: Mar. 23, 1995

[30] Foreign Application Priority Data

Sep. 13, 1993 [DE] Germany .............................. 43 31 033

[51] Int. Cl.⁶ ...................... G05B 19/18; G05B 19/4062
[52] U.S. Cl. ............................... 364/474.19; 364/474.28; 364/474.29
[58] Field of Search ........................... 364/474.19, 474.2, 364/474.17, 474.18, 474.28, 474.29, 474.32, 474.34, 474.35, 474.37

[56] References Cited

U.S. PATENT DOCUMENTS

| 3,678,190 | 7/1972 | Cook .......................................... 178/6.8 |
| 4,232,962 | 11/1980 | Sauer ........................................ 355/46 |
| 4,736,625 | 4/1988 | Patterson et al. ........................ 364/475 |
| 4,831,907 | 5/1989 | Gnann ........................................ 82/47 |
| 4,987,355 | 1/1991 | Leaper et al. ........................... 318/561 |
| 5,187,696 | 2/1993 | Ishii et al. .............................. 369/44.29 |
| 5,239,479 | 8/1993 | Nolting et al. ...................... 364/474.16 |
| 5,249,161 | 9/1993 | Jones et al. . |

FOREIGN PATENT DOCUMENTS

| 0247829 | 5/1986 | European Pat. Off. .......... G11B 7/09 |
| 0308840 | 3/1989 | European Pat. Off. ....... G05B 19/405 |
| 2520105 | 7/1983 | France .............................. G01B 7/00 |
| 3408523 | 9/1985 | Germany ....................... G05B 17/02 |
| 3640624 | 11/1987 | Germany ........................ G07C 3/00 |
| 3618349 | 12/1987 | Germany ....................... B23B 25/06 |
| 3742573 | 3/1989 | Germany ....................... G05B 19/18 |
| 4109139A1 | 9/1992 | Germany ........................ B23H 7/02 |
| 3131401 | 6/1991 | Japan ................................ B23B 3/30 |
| 332307 | 7/1930 | United Kingdom . |
| WO 89/10223 | 4/1988 | WIPO ............................. B23B 3/30 |
| WO 90/13747 | 5/1989 | WIPO ............................. F15B 9/09 |
| WO 91/16163 | 4/1991 | WIPO ............................. B23G 3/00 |

OTHER PUBLICATIONS

John D. Farrar, "Centauro T5 Twin Knife Copy lathe", Centauro Co., 1995.
Patent Abstracts of Japan, vol. 15, No. 171 (M–1108) Apr. 30, 1991 & JP, A, 03 035 902 (Okuma Mach Works) Feb. 15, 1991.
Patent Abstracts of Japan, vol. 9, No. 14 (M–352) Jan. 22, 1985 & JP, A, 59 161 250 (Citizen Tokei) Sep. 12, 1984.
Energie & Automation, Sep. 1989 (11th year) by Siemens (company brochure).
Informationsteil 1 Steuerung S3/C200, Maschinengrundausrüstungen, Jul. 18, 1989 by INDEX–Werke KG, Hahn & Tessky, Esslingen, Germany (company brochure).

*Primary Examiner*—Robert A. Weinhardt
*Assistant Examiner*—Cuong H. Nguyen
*Attorney, Agent, or Firm*—Paul J. Vincent

[57] ABSTRACT

The invention pertains to a process for monitoring bar cutoff on CNC-controlled automatic bar lathes having a main spindle (3), an auxiliary spindle (6) and a pull-away carriage (WS3). In cutting-off operations it is necessary to monitor whether the cutting-off operation has cleanly severed the workpiece from the unmachined part. This control prevents machine damage that could arise as a result of imperfectly severed workpieces. The invention provides that after the cutting-off operation is completed, the pull-away carriage is started in the direction of a predetermined control path. In the time the pull-away carriage moves along the control path, the contour variation is monitored and compared with a value for contour variation that was defined in no-load operation, i.e. without a workpiece. If upon comparison the contour variation exceeds a predeterminate threshold of difference, i.e. if the contour variation that was defined in no-load operation deviates by a certain value from the contour variation determined over the control path, this indicates that the workpiece was imperfectly severed from the unmachined part and an error signal is generated.

9 Claims, 2 Drawing Sheets

PROCESS FOR MONITORING BAR CUTOFF ON AUTOMATIC BAR LATHES

BACKGROUND OF THE INVENTION

The invention concerns a method for monitoring bar cutoff in CNC-controlled automatic bar lathes having a main spindle, an auxiliary spindle, and a pull-away carriage.

JP-A 3035902 describes a method with which the cutoff tool or the spindle of the tool machine is protected against damage by removing the cutoff workpiece from the spindle along a predetermined path after completion of the cutting-off procedure.

When carrying-out bar cutoff processes it is necessary to check whether or not the workpiece has been fully severed from the unmachined part. This checking procedure prevents machine damage which could be caused by incompletely severed workpieces.

DE A 36 40 624 describes a diagnostic device with which changes in variable operation parameters at certain typical positions of the machine as well as the reaction times necessary for the changes are stored in a memory during the normal machining (error-free operation) of a workpiece. During the processing of workpieces the changes in variable operation parameters as well as the reaction times are determined in each case at these typical operating positions and compared with values which had been stored during normal processing. In the event that the values do not differ by more than a predetermined amount, the processing is continued.

A process for checking bar cutoff on automatic bar lathes is known in the art through German laid-open publication DE 36 18 349 A1 with which operating conditions are initiated at the end of a predetermined time interval allotted to the cutting-off procedure, which effect a relative rotation of the spindles with respect to each other when the material has been fully severed at the cutoff location. A deviation between the predetermined relative rotation of the main spindle with respect to the auxiliary spindle and the actual relative rotation indicates the existence of a material connection, and a corresponding error signal is issued.

This method has the disadvantage that a separate examination procedure is necessary to monitor the cutting-off procedure, which delays the work process.

It is therefore the purpose of the invention to introduce a method for monitoring bar cutoff which does not introduce a delay in the work process to thereby minimize additional controlling time resulting from monitoring of the cutoff.

SUMMARY OF THE INVENTION

This purpose is achieved in that the pull-away carriage is started along a predetermined control path after termination of the cutting-off procedure; the carriage error is monitored during motion of the pull-away carriage along the control path; the carriage error value is compared to the value of the carriage error determined for motion of the pull-away carriage along the control path under no-load conditions; and an error signal is issued when a predetermined difference threshold between the two carriage error values is exceeded.

In accordance with the invention, the pull-away carriage is started along a predetermined control path after completion of the cutting-off procedure. During the time the pull-away carriage moves along the control path, the carriage error, e.g. the difference between the intended and the actual location of the pull-away carriage, is monitored and compared to a carriage error value determined under no-load conditions, e.g. without a workpiece. If, as a result of the carriage error comparison, a predetermined difference threshold is exceeded, e.g. a deviation by a predetermined amount between the carriage error determined under no-load conditions and the carriage error extracted along the control path indicates incomplete severing of the workpiece from the unmachined part and an error signal is issued.

The invention has the advantage that a separate processing step is not necessary for monitoring of the cutting-off procedure since, after the cutting-off procedure is ended, it is in any event necessary for the auxiliary spindle to be retracted together with the workpiece in order to remove the workpiece from the auxiliary spindle. This retraction path simultaneously serves as the control path which is then monitored by the method in accordance with the invention.

An advantageous embodiment of the invention provides that the carriage error be determined under no-load conditions and after termination of the cutting-off procedure during the acceleration phase of the pull-away carriage. In this fashion it is possible to immediately recognize whether the cutting-off procedure was successful or if a material connection remains.

Another advantageous embodiment of the invention provides that the carriage error be determined during the static phase, e.g. after termination of the pull-away carriage acceleration phase. In this fashion more close limits in determining the threshold value can be set, since irregularities in the starting-up phase do not effect measurements made during the static phase.

A further advantageous embodiment of the invention does not determine the carriage error, rather the carriage error slope. In this case, the maximum carriage error slope under no-load conditions is compared to the maximum carriage error slope at the beginning of the control path. In the event that a predetermined threshold value for the difference between the maximum carriage error slopes is exceeded, the existence of a material connection is recognized and an error signal issued.

The determination of the carriage error slope has the advantage of being able to already determine the smallest of material connections during the starting-up phase.

In an additional advantageous embodiment of the invention, a moment reduction is activated at the beginning of the control path after termination of the acceleration phase, e.g. the drive force acting on the pull-away carriage is reduced. In the event that the carriage error slope changes following activation of the moment reduction, an error signal is issued. This procedure renders the reference measurement under no-load conditions unnecessary.

A further embodiment of the invention provides for travelling along the control path towards the unmachined part, determining the carriage error slope or the carriage error, and comparing to the no-load values.

Pieces of material remaining on the cut-off workpiece can be recognized in the event that a change in the carriage error or in the carriage error slope occurs within a path length corresponding to the cutting width, i.e. the width of the cutting tool. In this fashion remaining pieces of material which do not form material connections can be recognized.

BRIEF DESCRIPTION OF THE DRAWING

In the following, the invention is described with reference to FIGS. 1 and 2.

DESCRIPTION OF THE PREFERRED EMBODIMENT

Figure 1:
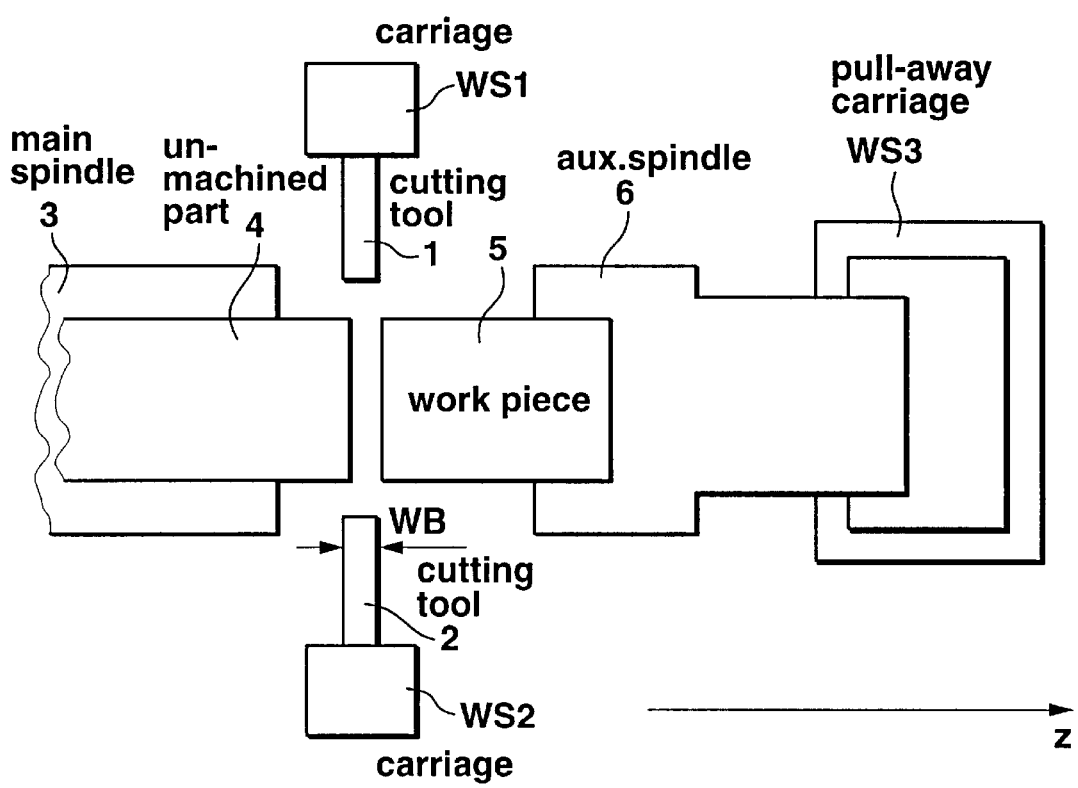
FIG. 1 shows a cutting-off apparatus.

FIG. 1 shows a schematic cutting-off apparatus having cutting tools hand 2 introduced on carriages WS1 and WS2. The cutting off apparatus also includes a main spindle 3 at which the unmachined part 4 is clamped. The workpiece 5, which is to be severed from the unmachined part 4 is attached to the auxiliary spindle 6. The pull-away carriage WS3 is arranged at auxiliary spindle 6. During the cutting-off procedure, the workpiece 5 is severed from the unmachined part 4, by means of cutting-off tools 1 and 2. After the cutting-off procedure is completed, the pull-away carriage WS3 with the auxiliary spindle 6 and with the cut-off workpiece 5 is moved in the direction of the Z-axis. This path simultaneously serves the purpose of a control path for determining the carriage error or the slope in the carriage error. The obtained carriage error or slope in carriage error is compared with a value of the carriage error or the carriage error slope respectively which had been previously determined under no-load conditions.

Figure 2:
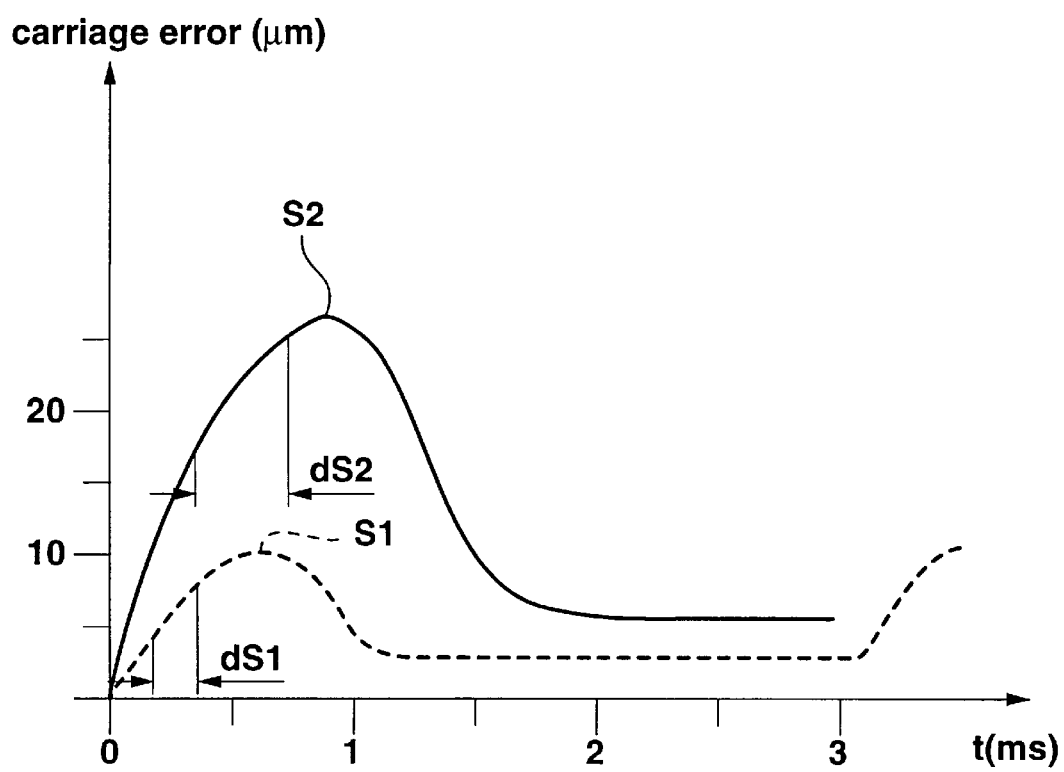
FIG. 2 shows a diagram of the carriage error under no-load conditions and along the control path.

Possible functional dependences of carriage error under no-load conditions and when travelling along the control path are shown in FIG. 2. In the figure, the carriage error (in $\mu$m) is given as a function of time t (in ms). The dashed-line shows the carriage error under no-load conditions and the solid line shows the carriage error when travelling along the control path. The maximum carriage errors are indicated with S1 (for no-load) and S2 (along the control path). The maximum carriage error slopes are, for example, indicated with dS1 and dS2 for the no-load condition and long the control path.

FIG. 2 shows a situation with which the workpiece has not been fully severed, e.g. where a material connection is present so that the carriage error S2 is larger than the carriage error S1 or the maximum carriage error slope dS2 is larger than the maximum carriage error slope dS1. A comparison between carriage errors leads, in each case, to determination of a threshold value S for the carriage error difference under no-load and along the control path. The threshold value is determined in such a fashion that possible variations in the carriage error dependence which do not necessarily indicate a material connection, do not lead to an error message. The following condition thereby results $$S < S2 - S1,$$

which must be fulfilled for an error signal to be issued. S is the predetermined threshold value, S1 the maximum carriage error under no-load conditions and S2 the maximum carriage error along the control path.

When monitoring the carriage error slope the condition:

$$dS < dS2 - dS1$$

is required for the issuance of an error signal, whereby dS is the determined threshold value, dS1 the maximum carriage error slope under no-load and dS2 the maximum carriage error slope along the control path.

In order to also be able to identify material remnants on the workpiece which do not lead to material connections, an additional control path in the -Z-direction can be taken and the carriage error or the carriage error slope can be determined under no-load conditions. In this case material remnants are recognized for travel starting from the initial position along a path corresponding to the width WB of the cutting-off tool. A difference between the carriage error or the carriage error slope in comparison to no-load conditions may only occur after this path length has been travelled through. A deviation in the carriage error or the carriage error slope at an earlier location indicates material remnants on the workpiece or on the unmachined part, whereby a limiting value, which must be exceeded, is also set in this case.

I claim:

1. A method for monitoring bar cutoff in CNC-controlled automatic bar lathes, the bar lathe having a main spindle, an auxiliary spindle and a pull-away carriage for supporting a cutoff workpiece, the method comprising the steps of:

moving the pull-away carriage away from the main spindle along a control path without the cutoff workpiece;

monitoring an unloaded carriage error without the workpiece during motion along said control path;

moving the pull-away carriage away from the main spindle along said control path, with the cutoff workpiece;

monitoring a loaded carriage error with the workpiece during motion along said control path;

comparing said loaded carriage error to said unloaded carriage error; and issuing an error signal if a difference between said loaded and unloaded carriage error exceeds a difference threshold.

2. The method of claim 1, wherein said unloaded and said loaded carriage error are each monitored during an acceleration phase of the pull-away carriage.

3. The method of claim 1, wherein said loaded and said unloaded carriage error are each monitored during a static motion phase of the pull-away carriage.

4. A method for monitoring bar cutoff in CNC-controlled automatic bar lathes, the bar lathe having a main spindle, an auxiliary spindle and a pull-away carriage for supporting a cutoff workpiece, the method comprising the steps of:

moving the pull-away carriage away from the main spindle along a control path without the cutoff workpiece;

monitoring an unloaded carriage error slope without the workpiece during motion along said control path;

moving the pull-away carriage away from the main spindle along said control path, with the cutoff workpiece;

monitoring a loaded carriage error slope with the workpiece during motion along said control path;

comparing said loaded carriage error slope to said unloaded carriage error slope; and issuing an error signal if a difference between said loaded and unloaded carriage error slopes exceeds a slope difference threshold.

5. The method of claim 4, further comprising the step of activating a moment reduction at a beginning of said control path after termination of an acceleration phase, wherein said monitoring of said unloaded and said loaded carriage error slopes is done after said activating of said moment reduction.

6. A method for monitoring bar cutoff in CNC-controlled automatic bar lathes, the bar lathe having a main spindle, an auxiliary spindle and a pull-away carriage for supporting a cutoff workpiece, the method comprising the steps of:

moving the pull-away carriage towards an unmachined part along a control path without the cutoff workpiece;

monitoring an unloaded carriage error without the workpiece during motion along said control path;

moving the pull-away carriage towards said unmachined part along said control path, with the cutoff workpiece;

monitoring a loaded carriage error with the workpiece during motion along said control path;

comparing said loaded carriage error to said unloaded carriage error; and issuing an error signal if a difference between said loaded and unloaded carriage error exceeds a difference threshold.

7. The method of claim 6, wherein said monitoring of said loaded and said unloaded carriage error is carried out along a control path length corresponding to a width of a cutting-off tool.

8. A method for monitoring bar cutoff in CNC-controlled automatic bar lathes, the bar lathe having a main spindle, an auxiliary spindle and a pull-away carriage for supporting a cutoff workpiece, the method comprising the steps of:

moving the pull-away carriage towards an unmachined part along a control path without the cutoff workpiece;

monitoring an unloaded carriage error slope without the workpiece during-motion along said control path;

moving the pull-away carriage towards said unmachined part from the main spindle along said control path, with the cutoff workpiece;

monitoring a loaded carriage error slope with the workpiece during motion along said control path;

comparing said loaded carriage error slope to said unloaded carriage error slope; and issuing an error signal if a difference between said loaded and unloaded carriage error slopes exceeds a slope difference threshold.

9. The method of claim 8, wherein said monitoring of said loaded and said unloaded carriage error slope is carried out along a control path length corresponding to a width of a cutting-off tool.

* * * * *